United States Patent
Bulea

(10) Patent No.: US 11,237,266 B2
(45) Date of Patent: Feb. 1, 2022

(54) MULTI-TONE ULTRASONIC PROXIMITY DETECTION

(71) Applicant: Synaptics Incorporated, San Jose, CA (US)

(72) Inventor: Mihai M. Bulea, San Jose, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 0 days.

(21) Appl. No.: 16/909,071

(22) Filed: Jun. 23, 2020

(65) Prior Publication Data

US 2021/0396872 A1    Dec. 23, 2021

(51) Int. Cl.
*G01S 15/04* (2006.01)
*G01S 15/36* (2006.01)

(52) U.S. Cl.
CPC ............. *G01S 15/04* (2013.01); *G01S 15/36* (2013.01)

(58) Field of Classification Search
CPC ................................. G01S 15/04; G01S 15/36
USPC ............................................................ 367/93
See application file for complete search history.

(56) References Cited

U.S. PATENT DOCUMENTS

| | | | | |
|---|---|---|---|---|
| 9,733,720 | B2* | 8/2017 | Kavli | G06F 3/017 |
| 10,757,661 | B1* | 8/2020 | Zhu | H04W 52/367 |
| 2002/0018198 | A1* | 2/2002 | Pierenkemper | G01S 7/4817 |
| | | | | 356/4.01 |
| 2006/0161871 | A1* | 7/2006 | Hotelling | G06F 3/0485 |
| | | | | 715/863 |
| 2011/0148798 | A1* | 6/2011 | Dahl | G06F 3/011 |
| | | | | 345/173 |
| 2014/0306936 | A1 | 10/2014 | Dahl et al. | |
| 2019/0187261 | A1* | 6/2019 | Peso Parada | G01S 15/04 |
| 2020/0158556 | A1* | 5/2020 | Strutt | G06F 1/3278 |

FOREIGN PATENT DOCUMENTS

EP    2470981 B1    4/2014

* cited by examiner

*Primary Examiner* — Kerri L McNally
(74) *Attorney, Agent, or Firm* — Paradice & Li LLP

(57) ABSTRACT

A method and apparatus for detecting the presence of an input object is provided. The apparatus may include one or more capacitive sensor electrodes, a speaker, a microphone, and a processor. The one or more capacitive sensor electrodes may detect a change in capacitance. The processor may cause the speaker to generate a first audio signal. The microphone may receive a first audio signal having the first frequency and a reflected first audio signal. The processor may determine a first phase difference between the first audio signal and the reflected first audio signal. The apparatus may detect the presence of the input object based on the determined first phase difference and the determined change in capacitance.

20 Claims, 5 Drawing Sheets

MULTI-TONE ULTRASONIC PROXIMITY DETECTION

TECHNICAL FIELD

This disclosure relates generally to proximity sensing devices, and more specifically to multi-tone ultrasonic proximity sensing devices.

BACKGROUND OF RELATED ART

Input devices, including proximity sensor devices (also commonly referred to as touchpads or touch sensor devices), are widely used in a variety of electronic systems. A proximity sensor device typically includes a sensing region, often associated with a surface, in which the proximity sensor device determines the presence, location, and/or motion of one or more input objects. Proximity sensor devices may provide an input interface for an electronic system. For example, proximity sensor devices may be used as input devices for larger electronic systems (such as opaque touchpads integrated in, or peripheral to, notebook or desktop computers). Proximity sensor devices may also be used in smaller electronics systems (such as touch screens integrated with cellular phones).

In some applications, it may be desirable to reliably detect the presence of an input object as it approaches the electronic system. For example, a user may hold a cellular phone and raise it toward his or her ear. As the phone comes very close to the head, it is desirable to perform an action in response, such as turning off the display. Thus, it is desirable to reliably detect the user's head or face while the user is holding the electronic system.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method to detect the presence of an input object with an input device is disclosed. The method may include outputting a first audio signal via a speaker of the input device and receiving the first audio signal and a reflection of the first audio signal. The method may further include determining a first phase difference between the received first audio signal and the received reflection of the first audio signal. The method may also include detecting a change in capacitance associated with a sensing region of the input device, the sensing region being provided at least in part by a plurality of sensor electrodes and detecting a presence of an input object based at least in part on the detected change in capacitance and the determined first phase difference.

An electronic system is disclosed. The electronic system may include one or more capacitive sensor electrodes, a speaker, one or more processors, and a memory configured to store instructions that, when executed by the one or more processors, cause the electronic system to output a first audio signal and to receive the first audio signal and a reflection of the first audio signal. Execution of the instructions may further cause the electronic system to determine a first phase difference between the received first audio signal and the received reflection of the first audio signal and detect a change in capacitance associated with a sensing region of the input device, the sensing region begin provided at least in part by a plurality of sensor electrodes. Execution of the instructions may also cause the electronic system to detect a presence of an input object based at least in part on the detected change in capacitance and the determined first phase difference Another electronic system is disclosed. The electronic system may include a means for outputting a first audio signal via a speaker of the input device, a means for receiving the first audio signal and a reflection of the first audio signal, and a means for determining a first phase difference between the received first audio signal the received reflection of the first audio signal. The electronic system may also include a means for detecting changes in capacitance associated with a sensing region of the input device, the sensing region being provided at least in part by a plurality of sensor electrodes and a means for detecting a presence of the input object based at least in part on the detected change in the capacitance and the determined first phase difference.

BRIEF DESCRIPTION OF THE DRAWINGS

The present embodiments are illustrated by way of example and are not intended to be limited by the figures of the accompanying drawings.

DETAILED DESCRIPTION

Figure 1:
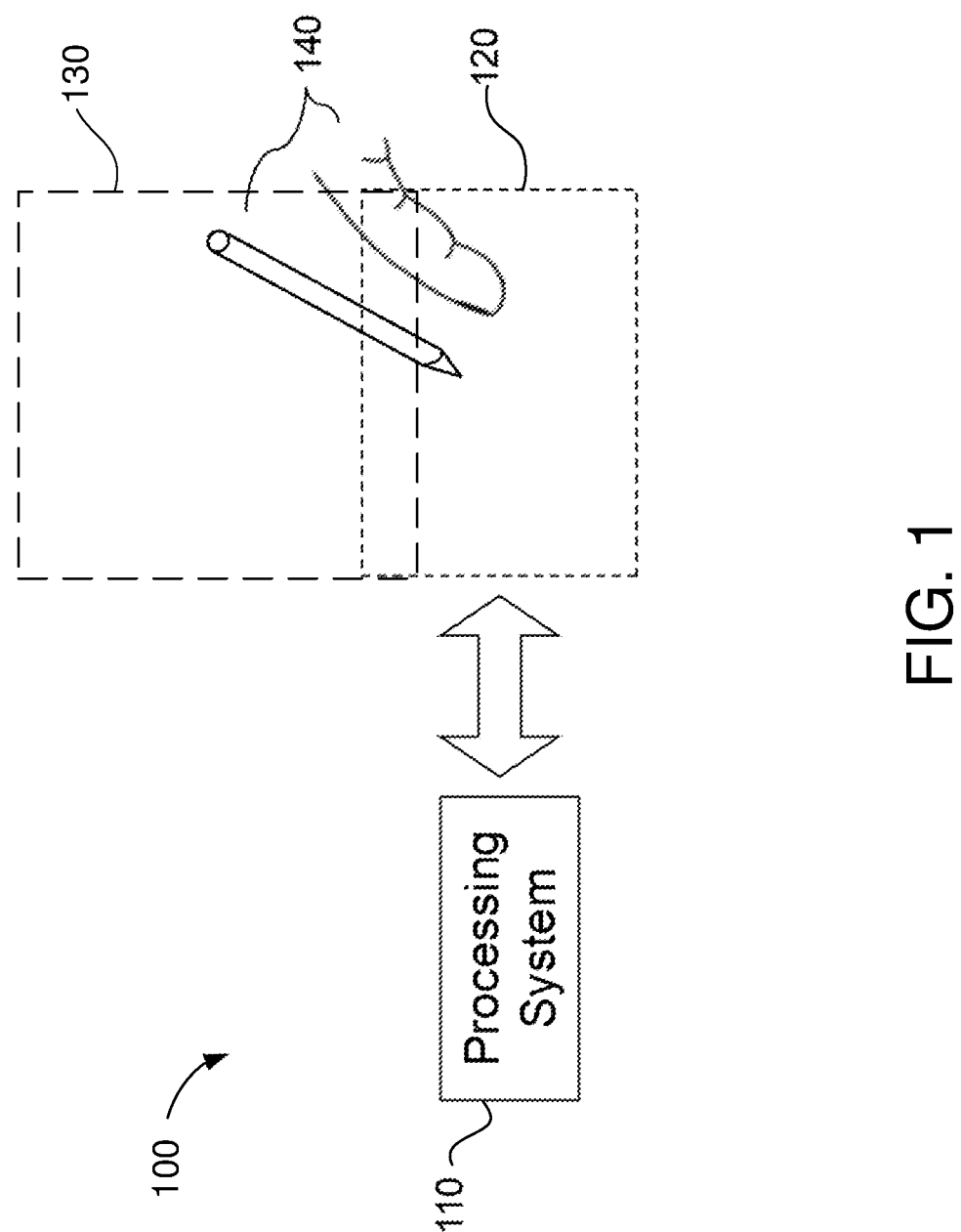
FIG. 1 shows an example input device in accordance with some implementations.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present disclosure, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the implementations disclosed herein may be executed by one or more processors. The term "processor," as used herein may refer to any general-purpose processor, conventional processor, controller, microcontroller, and/or state machine capable of executing scripts or instructions of one or more software programs stored in memory.

Some electronic devices use existing proximity sensors to determine the presence of a finger, stylus or other input object by detecting changes in capacitance. For example, a proximity sensor may include one or more sensor electrodes that detect changes in capacitive coupling between the one or more sensor electrodes and the input object. In some instances, it may be desirable to detect a second input object different from a first input object. For example, a cellular phone may include an existing proximity sensor. During operation, the user may hold the cellular phone and move the cellular phone toward his or her head. Upon detection of the user's head, the cellular phone may perform an operation such as dimming or turning off a display associated with the cellular phone. However, since the user is grasping the cellular phone, the existing proximity sensor may detect the user's hand and not detect the user's face.

In some implementations, an input object may be detected by using audio signals and detecting a change in capacitance. For example, an input device may transmit and receive one or more audio signals. The received audio signals may be reflected from the input object and the input device may determine a phase difference between a directly received audio signal and a reflected audio signal and also determine a change in capacitance. The input device may detect the input object based on the determined phase difference and the determined change in capacitance.

FIG. 1 shows an example input device 100 in accordance with some implementations. The input device 100 may include a processing system 110, a touch sensing region 120 (shown with short dashed lines), and an acoustic sensing region 130 (shown with long dashed lines).

The input device 100 may be configured to provide user input to an electronic system (not shown for simplicity). Examples of electronic systems may include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Example technologies may include Inter-Integrated Circuit ($I^2C$), Serial Peripheral Interface (SPI), PS/2, Universal Serial bus (USB), Infrared Data Association (IrDA), and various RF communication protocols.

In the example of FIG. 1, the input device 100 may include a proximity sensor device (e.g., also referred to as a "touchpad" or "touch sensor device") configured to sense input provided by one or more input objects 140 in the touch sensing region 120. Example input objects 140 include fingers or other parts of the body, styli, and the like. The touch sensing region 120 may encompass any space above, around, in, and/or proximate to the input device 100 in which the input device 100 is able to detect user input (such as provided by one or more input objects 140). The size, shape, and/or location of the sensing region 120 (e.g., relative to the electronic system) may vary depending on actual implementations.

In some implementations, the touch sensing region 120 may detect inputs involving no physical contact with any surfaces of the input device 100, contact with an input surface (e.g., a touch surface and/or screen) of the input device 100, contact with an input surface of the input device 100 coupled with some amount of applied force or pressure, and/or any combination thereof. In some implementations, input surfaces may be provided by, and/or projected on, one or more surfaces of a housing of the input device 100.

The input device 100 may use various sensing technologies to detect user input. Example sensing technologies may include capacitive, elastive, resistive, inductive, magnetic, acoustic, ultrasonic, and optical sensing technologies. In some implementations, the input device 100 may use capacitive sensing technologies to detect user inputs. For example, the touch sensing region 120 may include one or more capacitive sensing elements (e.g., sensor electrodes) to create an electric field. In some implementations, the sensor electrodes may be disposed on a surface, plane, or substrate associated with the touch sensing region 120. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input. The sensor electrodes may be arranged in arrays or other configurations to detect inputs at multiple points within the touch sensing region 120. In some aspects, some sensor electrodes may be ohmically shorted together to form larger sensor electrodes. Some capacitive sensing technologies may use resistive sheets that provide a uniform layer of resistance.

Example capacitive sensing technologies may be based on "self-capacitance" (also referred to as "absolute capacitance") and/or "mutual capacitance" (also referred to as "transcapacitance"). Absolute capacitance sensing methods may detect changes in the capacitive coupling between sensor electrodes and an input object. For example, an input object near the sensor electrodes may alter the electric field near the sensor electrodes, thus changing the measured capacitive coupling. In some implementations, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground reference voltage.

Transcapacitance sensing methods may detect changes in the capacitive coupling between sensor electrodes. For example, an input object near the sensor electrodes may alter the electric field between the sensor electrodes, thus changing the measured capacitive coupling of the sensor electrodes. In some implementations, the input device 100 may implement transcapacitance sensing by detecting the capacitive coupling between one or more "transmitter" sensor electrodes and one or more "receiver" sensor electrodes. Transmitter sensor electrodes may be modulated relative to the receiver sensor electrodes. For example, the transmitter sensor electrodes may be modulated relative to a reference voltage to transmit signals, while the receiver sensor electrodes may be held at a relatively constant voltage to "receive" the transmitted signals. The signals received by the receiver sensor electrodes may be affected by environmental interference (e.g., from other electromagnetic signals and/or objects in contact with, or in close proximity to, the sensor electrodes). In some aspects, each sensor electrode may either be a dedicated transmitter or a dedicated receiver. In other aspects, each sensor electrode may be configured to transmit and receive.

The input device 100 may also detect the presence of an input object 140 within the acoustic sensing region 130. In some implementations, the acoustic sensing region 130 may include or overlap some or all of the touch sensing region 120. The input device 100 may include one or more audio output components to transmit (e.g., output) audio signals and one or more audio input components to receive audio signals that may be used to detect the input objects 140. In some implementations, the audio signals may be ultrasonic or subsonic audio signals including frequencies above or below a conventional audible range.

The processing system 110 may be configured to operate the hardware of the input device 100 to detect input objects 140 in the touch sensing region 120 and/or in the acoustic sensing region 130. In some implementations, the processing system 110 may control one or more sensor electrodes to detect input objects 140 in the touch sensing region 120. For example, the processing system 110 may be configured to transmit signals via one or more transmitter sensor electrodes and receive signals via one or more receiver sensor electrodes to detect an input object 140 in the touch sensing region 120. The processing system 110 may control one or more audio input and output components (e.g., speakers, microphones, and the like) to detect input objects 140 in the acoustic sensing region 130. For example, the processing system 110 may also be configured to output and/or emit one or more audio signals from a speaker and receive direct and reflected audio signals through a microphone to detect input object 140 in the acoustic sensing region 130. In some aspects, one or more components of the processing system 110 may be co-located, for example, in close proximity to the sensing elements of the input device 100. In other aspects, one or more components of the processing system 110 may be physically separated from the sensing elements of the input device 100. For example, the input device 100 may be a peripheral coupled to a computing device, and the processing system 110 may be implemented as software executed by a central processing unit (CPU) of the computing device. In another example, the input device 100 may be physically integrated in a mobile device, and the processing system 110 may correspond, at least in part, to a CPU of the mobile device.

In some implementations, the processing system 110 may be implemented as a set of modules that are implemented in firmware, software, or a combination thereof. Example modules include hardware operation modules for operating hardware such as sensor electrodes and display screens, data processing modules for processing data such as sensor signals and positional information, and reporting modules for reporting information. In some implementations, the processing system 110 may include sensor operation modules configured to operate sensing elements to detect user input in the touch sensing region 120 and detect user input in the acoustic sensing region 130.

The processing system 110 may operate the sensing elements and/or audio transducers of the input device 100 to produce electrical signals indicative of input (or lack of input) in the touch sensing region 120 and/or the acoustic sensing region 130. The processing system 110 may perform any appropriate amount of processing on the electrical signals to translate or generate the information provided to the electronic system. For example, the processing system 110 may digitize analog signals received via the sensor electrodes and/or transducers and perform filtering or conditioning on the received signals. In some aspects, the processing system 110 may subtract or otherwise account for a "baseline" associated with the sensor electrodes and transducers. For example, the baseline may represent a state of the sensor electrodes and transducers when no user input is detected. Accordingly, the information provided by the processing system 110 to the electronic system may reflect a difference between the signals received from the sensor electrodes and a baseline associated with each sensor electrode and transducer.

Figure 2:
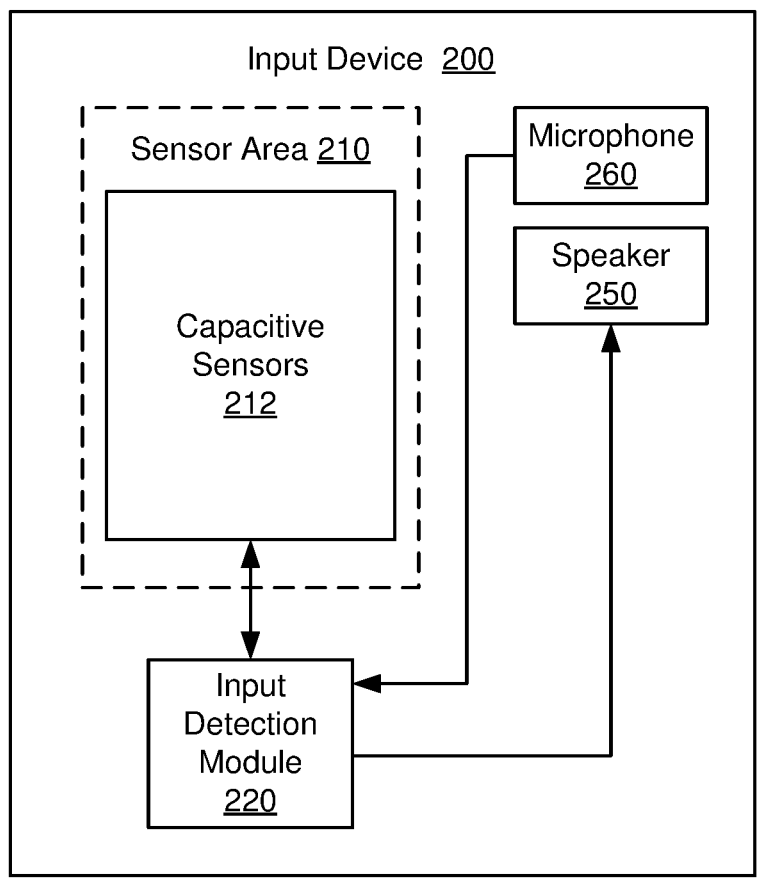
FIG. 2 is a block diagram of an input device, in accordance with some implementations.

FIG. 2 is a block diagram of an input device 200, in accordance with some implementations. The input device 200 may be one example of the input device 100 of FIG. 1 and may include a touch sensor area 210, an input detection module 220, a speaker 250, and a microphone 260. The size, shape, and/or location of the touch sensor area 210 may vary depending on actual implementations.

In some implementations, the touch sensor area 210 may include, or otherwise be coupled to, capacitive sensors 212. For example, the capacitive sensors 212 may include an array of sensor electrodes that create an electric field in and/or around the touch sensor area 210. The input device 200 may sense user inputs by detecting or evaluating changes in capacitance or electric fields through the capacitive sensors 212. In some implementations, the capacitive sensors 212 may include transmitter sensor electrodes and receiver sensor electrodes (not shown for simplicity).

The speaker 250 and the microphone 260 may be positioned separate and away from the touch sensor area 210. The speaker 250 may emit one or more audio signals (not shown for simplicity). In some implementations, the speaker 250 and the microphone 260 may be dedicated for use by the input device 200. In other implementations, the speaker 250 and the microphone 260 may be shared with other of devices. For example, if the input device 200 is included in a cellular phone, the speaker 250 and the microphone 260 may also be used to provide phone call audio and receive the user's voice, respectively. In another example, if the input device 200 is included in a tablet or laptop computer, then the speaker 250 and the microphone 260 may also be used to reproduce audio signals and capture audio signals for one or more programs or applications executed by the tablet or laptop computer.

The input device 200 may use the speaker 250 and the microphone 260 to detect an input object using audio signals. In some implementations, the speaker 250 may be capable of outputting one or more audio signals including ultrasonic and/or subsonic audio signals. The microphone 260 may receive one or more audio signals, including ultrasonic or subsonic audio signals, directly from the speaker and reflected from the input object. The input device 200 may detect the input object by detecting a phase difference between a direct and a reflected audio signal. In some implementations, the input device 200 may determine a distance to the input object from the input device 200 based on the phase difference.

The capacitive sensors 212, the speaker 250, and the microphone 260 may be coupled to the input detection module 220. The input detection module 220, which may be implemented by, or include at least a portion of a processing system (such as the processing system 110 of FIG. 1), controls operation of the capacitive sensors 212, the speaker 250, and the microphone 260. For example, the input detection module 220 may operate the capacitive sensors 212 to detect changes in electric fields and/or capacitance due to interactions with an input object. The input detection module 220 may also operate the speaker 250 and the microphone 260 to output one or more audio signals and detect one or more direct and reflected audio signals. For example, the input detection module 220 may cause the speaker 250 to output at least one audio signal and receive a reflection of the audio signal via the microphone 260. An operation of the speaker 250 and the microphone 260 is described in more detail with reference to FIGS. 3-5.

Figure 3:
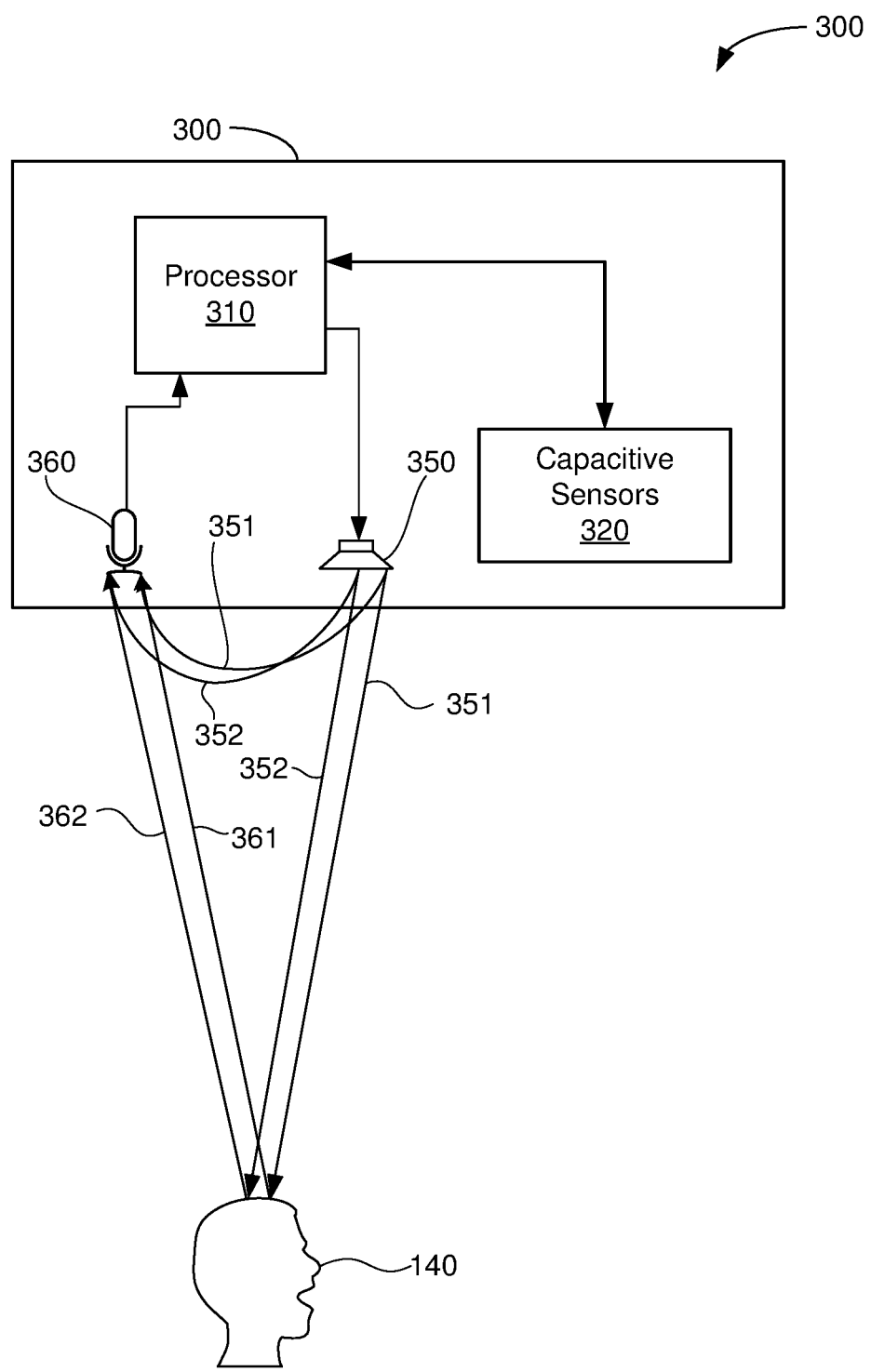
FIG. 3 shows simplified diagram of an input device, in accordance with some implementations.

FIG. 3 shows simplified diagram of an input device 300, in accordance with some implementations. The input device 300 may be one example of the input device 100 of FIG. 1 or the input device 200 of FIG. 2 and may include a processor 310, capacitive sensors 320, a speaker 350, and a microphone 360. The speaker 350 and the microphone 360 may be example implementations of the speaker 250 and the microphone 260 of FIG. 2. The input device 300 may detect the presence of the input object 140 by evaluating currents and/or voltages associated with the capacitive sensors 320 to detect changes in electric fields and/or capacitance. The input device 300 may also detect the presence of the input object 140 by causing the speaker 350 to output an audio signal. The audio signal may be reflected by the input object 140 and received by the microphone 360 The input device 300 can determine time-of-flight information associated with a reflected and a non-reflected (e.g., directly received) audio signal, and from the determined time-of-flight information determine a distance between the input object 140 and the input device 300. In some implementations, the detection of the input object 140 may be based on the determined distance. In other implementations, the input device 300 may detect the input object 140 based on a combination of capacitance information from the capacitive sensors 320 and time-of-flight information based on audio signals output and received by the speaker 350 and the microphone 360, respectively.

In some implementations, the processor 310 may cause the speaker 350 to output one or more ultrasonic or subsonic audio signals. For example, the speaker 350 may output a first audio signal 351 including a first frequency $f_1$. The first audio signal 351 may be reflected by the input object 140 causing a reflected first audio signal 361 to be received by the microphone 360. The first audio signal 351 may also be received directly from the speaker 350. The processor 310 may determine a first phase 81 describing a phase difference between the first audio signal 351 and the reflected first audio signal 361 reflected from the input object 140. The first phase 81 may be based on the time-of-flight of the audio signals and used to determine the distance between the input object 140 and the input device 300.

The received audio signals may be expressed as a function of time R(t) in equation 1:

$$R(t) = \sin(\omega_1 t) + K \sin(\omega_1 t + \theta_1), K < 1.0 \qquad \text{eq. 1}$$

Where $\omega_1$ is the frequency $f_1$ expressed in radians,
t is time (e.g., time in seconds, when $\omega_1$ is expressed in radians per second), and
$\theta_1$ is the phase difference between the first audio signal 351 and the reflected first audio signal 361.

The first term ($\sin(\omega_1 t)$) represents the first audio signal 351 received directly from the speaker 350 as may be the case when the microphone 360 is positioned close to the speaker 350. For example, the microphone 360 and the speaker 350 may be placed next to each other or co-located as part of a common assembly or subassembly of an electronic device. The second term ($K \sin(\omega_1 t + \theta_1)$) represents the reflected first audio signal 361 that is reflected from the input object 140. Thus, the constant K represents a signal attenuation of the first audio signal 351 reflecting off the input object 140 and traveling through air.

In some implementations, the processor 310 may perform an I/O demodulation on the received audio signals to determine the first phase 81. For example, the processor 310 may multiply the received audio signals expressed by equation 1 by $\sin(\omega_1 t)$ and $\cos(\omega_1 t)$. Such a multiplication may provide a result that may be split into two equations. The first equation may include cosine terms as shown below in equation 2:

$$S_1(t) = 1 + K \cos(\theta_1) \qquad \text{eq. 2}$$

The second equation may include sine terms, as shown below in equation 3:

$$C_1(t) = K \sin(\theta_1) \qquad \text{eq. 3}$$

Combining equation 2 and equation 3 and solving for 81 results in equation 4:

$$\theta_1 = \arctan\left(\frac{C_1(t)}{S_1(t) - 1}\right) + 2\pi M \qquad \text{eq. 4}$$

Where M in an integer.

The first phase $\theta_1$ describes the time difference between the first audio signal 351 that is received directly from the speaker 350 and the reflected first audio signal 361 that is reflected from the input object 140 and may be used to determine the distance between the input object 140 and the input device 300. In turn, the determined distance may be used to determine the presence of the input object 140. However, due to the periodic nature of audio signals, there may be some ambiguity regarding first phase 81 as indicated by the 27M term in equation 4. That is, since audio signals have a periodic frequency, the first phase $\theta_1$ may have multiple solutions (e.g., the solution of equation 4 may be ambiguous). A second audio signal including a second frequency $f_2$ different than the first frequency $f_1$ may be used to reduce the ambiguity.

For example, the processor 310 may cause the speaker 350 to output a second audio signal 352 including the second frequency $f_2$. The second audio signal 352 may be reflected by the input object 140 causing a reflected second audio signal 362 to be received by the microphone 360. The second audio signal 352 may also be received directly from the speaker 350. The processor 310 may determine a second phase $\eta_2$ describing a phase difference between the second audio signal 352 directly received from the speaker 350 and the reflected second audio signal reflected from the object 140 as expressed in equation 5:

$$\theta_2 = \arctan\left(\frac{C_2(t)}{S_2(t) - 1}\right) + 2\pi N \qquad \text{eq. 5}$$

Where N is an integer, N≥M (e.g., $f_2 > f_1$).

It can be shown that the difference between equation 4 and equation 5 may be used to determine the travel time of audio signals from the input device 300 to the input object 140 and back to the input device 300. For example, the difference between the second phase $\theta_2$ and the first phase $\theta_1$ may be expressed in equation 6:

$$\eta_2 - \theta_1 = \omega_2 \tau - \omega_1 \tau \qquad \text{eq. 6}$$

Where $\tau$ is the travel time.

Equation 6 may be solved for $\tau$, as expressed by equation 7:

$$\tau = \frac{\theta_2 - \theta_1}{\omega_2 - \omega_1} = \frac{\theta_2 - \theta_1}{2\pi(f_2 - f_1)} \qquad \text{eq. 7}$$

The travel time $\tau$ may be associated with twice the distance between the input device 300 and the input object 140 since the path of the audio signal is also twice the distance between the processing device and the input object 140. The input device 300 may determine the distance to the input object 140 using the travel time r and the velocity of sound in air.

The second audio signal 352 may be transmitted at a different time (e.g., separately from) the first audio signal 351. However, transmitting the first audio signal 351 separately from the second audio signal 352 may increase processing time and the determination of the travel time may be affected by motion of the input object 140. In other words, the input object 140 may move between the time the first audio signal 351 is transmitted and the second audio signal 352 is transmitted. This motion may cause inaccuracies the determined travel times of the audio signals. Simultaneous transmission of the first audio signal 351 and the second audio signal 352 may reduce processing time and reduce the motion effects of the input object 140.

The audio signals may include audible signals, ultrasonic signals, and/or subsonic signals. Audible signals are audio signals within the hearing range of most people. In contrast, ultrasonic and subsonic signals are beyond the hearing range of most people. The use of ultrasonic (e.g., signals having a frequency at or above approximately 20 KHz) and subsonic (e.g., signals having a frequency at or below approximately 20 Hz) signals may be less intrusive and/or distracting to the user. Further, because ultrasonic signals have shorter wavelengths, the ambiguity of the determined distance may be less than the ambiguity associated with non-ultrasonic audio signals. In some implementations, the difference between the first frequency $f_1$ and the second frequency $f_2$ may the affect ambiguity. For example, if the difference between the first frequency $f_1$ and the second frequency $f_2$ is 1 KHz, then the ambiguity may be less than 17 centimeters. If the difference between the first frequency $f_1$ and the second frequency $f_2$ is 2 KHz, then the ambiguity may be less than 8.5 centimeters. Ambiguity may be further reduced by transmitting and receiving a third audio signal. In some implementations, the third audio signal and the third received audio signal may have a third frequency $f_3$ different from the first frequency $f_1$ and the second frequency $f_2$.

In some implementations, the input device 300 may use the capacitive sensors 320 to perform capacitive sensing and the speaker 350 and microphone 360 to perform acoustic sensing to cooperatively determine the presence of an input object. For example, acoustic sensing may be used to detect input objects within an acoustic sensing region while capacitive sensing may be used to detect input objects within a touch sensing region.

In other implementations, acoustic sensing may detect the presence an input object 140 in an acoustic sensing region that may be beyond a touch sensing region. The capacitive sensors 320 may detect a change in capacitance as the input object 140 comes closer to the input device 300. If the change in capacitance is greater than a threshold, then the input device 300 may detect the presence of the input object 140 within a predetermined distance of the input device 300.

For example, a cellular phone may include the input device 300. The input device 300 may use acoustic sensing to detect a user's head in an acoustic sensing region that may be beyond a touch sensing region. The input device 300 may continue to detect the user's head as the user brings the phone close to his or her ear. As the phone becomes near the user's head, the capacitive sensors 320 may detect a change in capacitance greater than a threshold. A change in capacitance greater than a threshold may indicate the presence of the user's head within a predetermined distance of the input device. Detecting the presence of the user's head within a predetermined distance may be used to perform a subsequent task such as dimming of a display. In some implementations, the capacitive sensors 320 may provide a touch image associated with the input object 140. The touch image may an image that includes different patterns that are associated with different input objects. Thus, in some cases, the input device 300 may detect changes to the touch image with respect to time in combination with acoustic sensing techniques to detect the presence of the user's head.

In some implementations, acoustic sensing and capacitive sensing techniques may be used together to reduce or eliminate "false positive" indications of an input object. For example, if the input device 300 detects an input object with capacitive sensing techniques but not with acoustic sensing techniques, then the capacitive sensing techniques may indicate a false positive detection. This false positive detection may be disregarded. Similarly, if the input device 300 detects an input object with acoustic sensing techniques but not with capacitive sensing techniques, then the acoustic sensing techniques may indicate a false positive detection. Thus, a positive indication of an input object from a first sensing technique may be verified with a positive indication of the input object by a second sensing technique.

Figure 4:
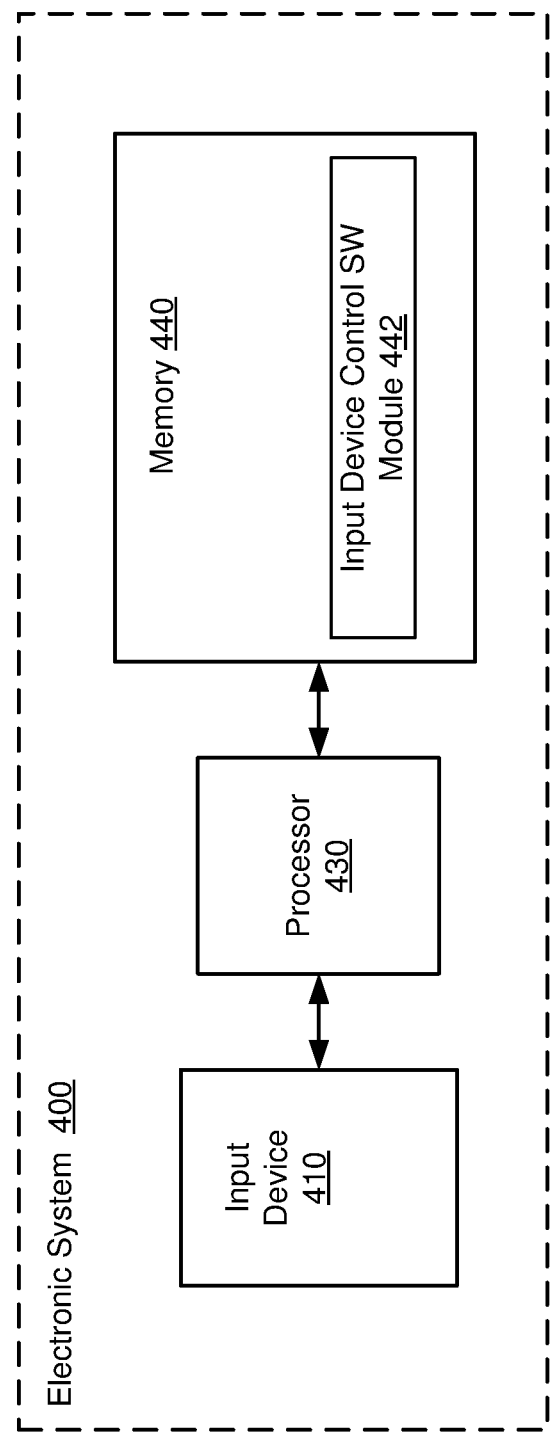
FIG. 4 is a block diagram of an example electronic system

FIG. 4 is a block diagram of an example electronic system 400. The electronic system 400 may include an input device 410, a processor 430, and a memory 440. The input device 410 may be an example of the input device 100 of FIG. 1, the input device 200 of FIG. 2, the input device 300 of FIG. 3, or any other feasible input device. The input device 410 may be coupled to, and at least partially controlled by the processor 430. In some implementations, the processor 430 may provide the functionality of the processing system 110 described with respect to FIG. 1. The input device 410 may include capacitive sensors, one or more speakers, and one or more microphones, not shown for simplicity.

The memory 440 may include a non-transitory computer-readable storage medium (such as one or more nonvolatile memory elements, such as EPROM, EEPROM, Flash memory, a hard drive, and so on) that may store an input device control software (SW) module 442 to control operations of the input device 410.

The processor 430, which may be coupled to the input device 410, and the memory 440, may be any one or more suitable controllers, processors, state machines or the like capable of executing scripts or instructions of one or more software programs stored in the electronic system 400 (e.g., within the memory 440). In some embodiments, the processor 430 may be implemented with a hardware controller, a processor, a state machine, or other circuits to provide the functionality of the processor 430 executing instructions stored in the memory 440.

The processor 430 may execute the input device control SW module 442 to detect the presence or motion associated with an input object with the input device 410. In some implementations, the processor 430 may execute the input device control SW module 442 to operate the input device 410 to detect input objects acoustically within an acoustic sensing region by transmitting one or more audio signals through one or more speakers and receiving one or more audio signals through one or more microphones. The processor 430 may determine a phase difference between direct and reflected audio signals. From the phase difference, the processor 430 may determine the presence of and/or the distance to an input object. The one or more audio signals may be audible, ultrasonic, and/or subsonic audio signals. The processor 430 may output two or more audio signals simultaneously. Each audio signal may have a different frequency.

In other implementations, the processor 430 can execute the input device control SW module 442 to operate the input device 410 to detect input objects by detecting changes in capacitance associated with one or more capacitive sensor electrodes. The changes in capacitance may be due to an interaction between the input object and electric fields detected by the one or more capacitive sensor electrodes. In some implementations, the processor 430 can execute the input device control SW module 442 to determine when the change in capacitance is greater than a threshold. A change in capacitance that is greater than a threshold may indicate that the input object is within a predetermined distance from the input device 410.

In still other implementations, the processor 430 can execute the input device control SW module 442 to operate the input device 410 to determine the presence of the input object through both capacitive sensing and acoustic sensing techniques.

Figure 5:
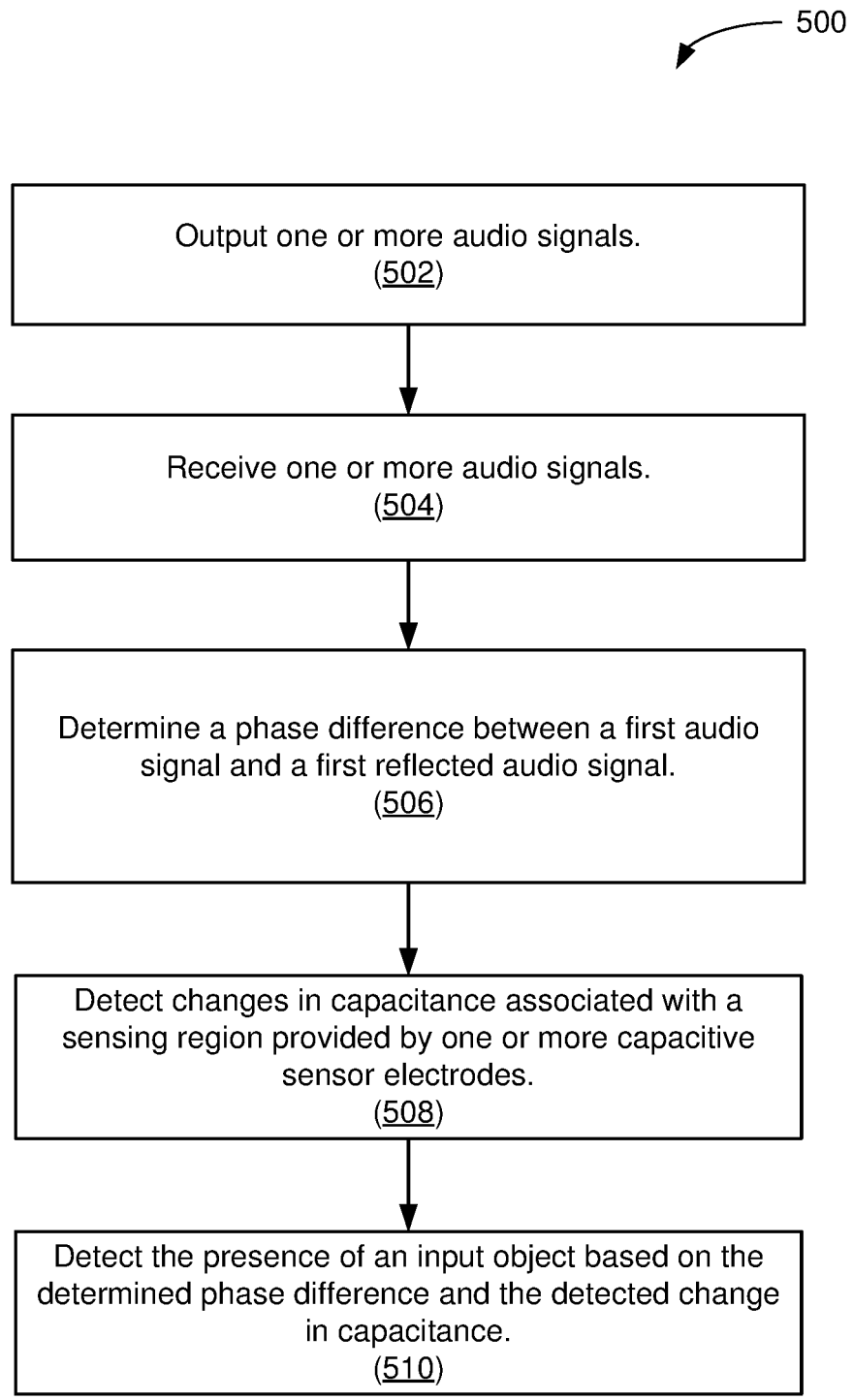
FIG. 5 shows an illustrative flowchart depicting an example operation for detecting an input object.

FIG. 5 shows an illustrative flowchart depicting an example operation 500 for detecting an input object. The operation 500 is described below with respect to the input device 300 of FIG. 3 for illustrative purposes only. The operation 500 may be used to operate the input device 200 of FIG. 2, or any other feasible input device.

The operation 500 begins as the input device 300 outputs one or more audio signals (502). For example, the processor 310 may cause the speaker 350 to output the first audio signal 351 having a first frequency. In some implementations, the first frequency may be greater than or equal to 20 KHz. In other implementations, the processor 310 may cause the speaker 350 to output multiple audio signals. For example, the processor 310 may cause the speaker 350 to also output the second audio signal 352 having a second frequency different than the first frequency. In some implementations, the difference between the first frequency and the second frequency may be greater than or equal to one KHz. The processor 310 may cause the speaker 350 to output the first audio signal 351 and the second audio signal 352 simultaneously or sequentially. In still other implementations, the processor 310 may cause the speaker 350 to transmit three or more audio signals.

Next, the input device 300 receives one or more audio signals (504). For example, the microphone 360 may receive the first audio signal 351 and/or the reflected first audio signal 361. Next, the input device 300 determines a phase difference between a first audio signal 351 and the reflected first audio signal 361 (506). For example, the first phase difference may be determined using I/O demodulation and may be proportional to the time-of-flight between the input device 300 and an input object. In other implementations, the input device 300 may determine multiple phase differences between multiple direct and reflected audio signals. For example, the input device 300 may determine a second phase difference between the second audio signal 352 and the second reflected audio signal 362.

Next, the input device 300 detects a change in capacitance associated with a sensing region provided by one or more capacitive sensor electrodes (508). For example, the processor 310 may generate and receive electric fields through one or more capacitive sensors 320. The processor 310 may detect changes in capacitance based on detected changes in the received electric fields. In some implementations, the processor 310 may determine a change in capacitance greater than a threshold to indicate that an input object is within a predetermined distance from the capacitive sensors 320.

The input device 300 detects the presence of an input object based on the determined phase difference and the detected change in capacitance (510). For example, the input device 300 may detect the presence of the input object based on a distance associated with the determined phase difference and detected changes in capacitance that are greater than a threshold. In some implementations, the input device 300 may determine the distance to the input object based on a difference between the first phase difference and the second phase difference.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for detecting input objects by an input device, comprising:
   outputting a first audio signal via an audio output component of the input device;
   receiving the first audio signal and a reflection of the first audio signal via an audio input component of the input device;
   determining a first phase difference between the received first audio signal and the received reflection of the first audio signal;
   detecting a change in capacitance associated with a sensing region of the input device, the sensing region being provided at least in part by a plurality of sensor electrodes; and
   detecting a presence of an input object based at least in part on the detected change in capacitance and the determined first phase difference.

2. The method of claim 1, wherein the detecting the presence of the input object comprises:
   determining a distance between the input object and the input device based at least in part on the first phase difference; and
   detecting the presence of the input object based at least in part on the determined distance.

3. The method of claim 1, wherein changes in capacitance are based at least in part on a capacitive coupling between the input object and an electric field generated by one or more capacitive sensor electrodes.

4. The method of claim 1, wherein the first audio signal has a frequency greater than or equal to 20 KHz.

5. The method of claim 1, wherein the detecting the presence of the input object comprises:
   outputting a second audio signal;
   receiving the second audio signal and a reflection of the second audio signal via the audio input component;
   determining a second phase difference between the received second audio signal and the received reflection of the second audio signal; and
   detecting the presence of the input object based at least in part on the determined second phase difference.

6. The method of claim 5, wherein the detecting the presence of the input object comprises:
   determining a difference between the second phase difference and the first phase difference;
   determining a travel time of one or more audio signals based at least in part on the difference between the second phase difference and the first phase difference; and
   detecting the presence of the input object based at least in part on the determined travel time.

7. The method of claim 5, wherein the first phase difference is based at least in part on a time-of-flight of the first audio signal and the second phase difference is based at least in part on the time-of-flight of the second audio signal.

8. The method of claim 5, wherein the first audio signal and the second audio signal are generated simultaneously.

9. The method of claim 5, wherein the first audio signal and the second audio signal are generated sequentially.

10. The method of claim 5, wherein the first audio signal has a frequency different than the second audio signal.

11. The method of claim 10, wherein a difference between the frequency of the first audio signal and the frequency of the second audio signal is greater than or equal to one KHz.

12. The method of claim 1, wherein the detecting the change in capacitance comprises detecting a change in capacitance greater than a threshold.

13. An electronic system comprising:
   one or more capacitive sensor electrodes;
   an audio input component;
   an audio output component;
   one or more processors; and
   a memory configured to store instructions that, when executed by the one or more processors, cause the electronic system to:
      output a first audio signal via the audio output component;
      receive the first audio signal and a reflection of the first audio signal via the audio input component;
      determine a first phase difference between the received first audio signal and the received reflection of the first audio signal;
      detect a change in capacitance associated with a sensing region of the electronic system, the sensing region being provided at least in part by a plurality of sensor electrodes; and detect a presence of an input object based at least in part on the detected change in capacitance and the determined first phase difference.

14. The electronic system of claim 13, wherein execution of the instructions to detect the presence of the input object causes the electronic system to further:
   determine a distance between the input object and the electronic system; and
   detect the presence of the input object based at least in part on the determined distance.

15. The electronic system of claim 13, wherein the changes in capacitance are based at least in part on a capacitive coupling between the input object and an electric field generated by one or more of the capacitive sensor electrodes.

16. The electronic system of claim 13, wherein the first audio signal has a frequency greater than or equal to 20 KHz.

17. The electronic system of claim 13, wherein execution of the instructions to detect the presence of the input object causes the electronic system to further:
   output a second audio signal;
   receive the second audio signal and a reflection of the second audio signal;
   determine a second phase difference between the received second audio signal and the received reflection of the second audio signal; and
   detect the presence of the input object based at least in part on the determined second phase difference.

18. The electronic system of claim 17, wherein execution of the instructions to detect the presence of the input object causes the electronic system to further:
   determine a difference between the second phase difference and the first phase difference;
   determine a travel time of one or more audio signals based at least in part on the difference between the second phase difference and the first phase difference; and
   detect the presence of the input object based at least in part on the determined travel time.

19. The electronic system of claim 17, wherein the first audio signal has a frequency different than the second audio signals.

20. An electronic system comprising:
   means for outputting a first audio signal via an audio output component of an input device;
   means for receiving the first audio signal and a reflection of the first audio signal via an audio input component;
   means for determining a phase difference between received first audio signal and the received reflection of the first audio signal;
   means for detecting a change in a capacitance associated with a sensing region of the input device, the sensing region being provided at least in part by a plurality of sensor electrodes; and
   means for detecting a presence of an input object based at least in part on the detected change in the capacitance and the determined phase difference.

\* \* \* \* \*